Dec. 5, 1939.　　　　R. F. PEO　　　　2,182,569
ROOF MOUNTED AIR CONDITIONER
Filed Jan. 21, 1937　　　2 Sheets-Sheet 1

Inventor
Ralph F. Peo.

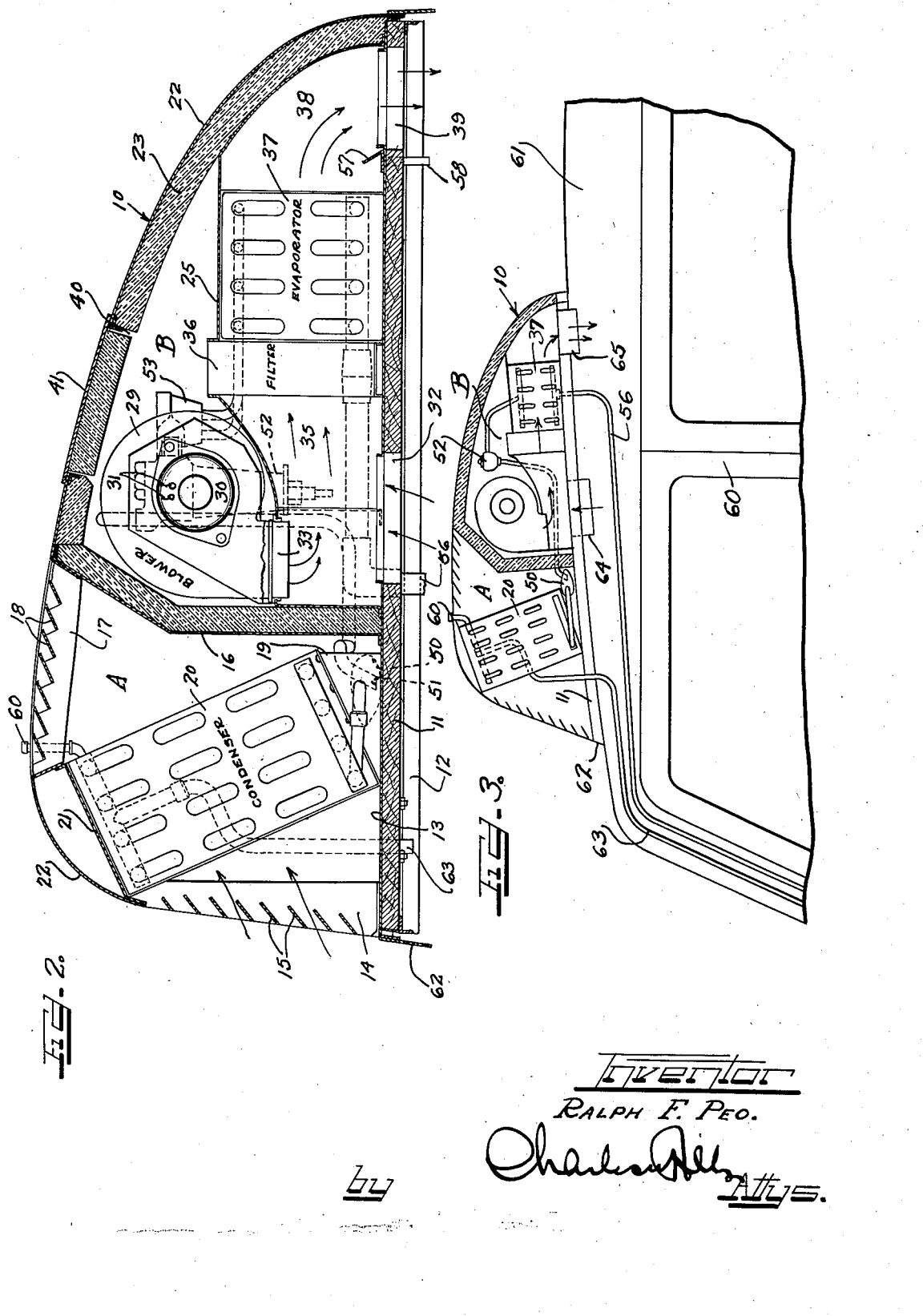

Patented Dec. 5, 1939

2,182,569

UNITED STATES PATENT OFFICE 2,182,569

ROOF MOUNTED AIR CONDITIONER

Ralph F. Peo, Buffalo, N. Y., assignor to Houde Engineering Corporation, Buffalo, N. Y., a corporation of New York Application January 21, 1937, Serial No. 121,449

7 Claims. (Cl. 62—117)

This invention relates to air cooling apparatus for vehicles and more specifically relates to an air cooling unit adapted to be mounted on the roof of a vehicle for drawing air from the passenger or storage space of the vehicle through the roof thereof, conditioning the air in the unit on the roof and circulating the conditioned air back to the passenger or storage space.

This application is a continuation-in-part of my copending application entitled: "Automobile air conditioning system", Serial No. 82,400, filed May 29, 1936, now U. S. Patent No. 2,115,785, dated May 3, 1938.

The air cooling or conditioning unit of this invention comprises a compact streamlined housing built up from a baseboard that is readily adapted to be carried on the roofs of automotive vehicles. The housing contains the condenser, evaporator, expansion valve and one or more blowers of a refrigerating system of the compressor-condenser-evaporator type. The compressor of the system can be mounted in the motor compartment of the vehicle and driven by the vehicle motor.

The unit of this invention is readily adapted for mounting on all types of closed vehicles and merely requires the cutting of several holes through the roof of the vehicle for the circulation of air in the vehicle into and out of the housing.

The units of this invention are provided with two isolated compartments. One of the compartments receives the condenser coils of the refrigerating system and is in free air receiving relation. The other of said compartments is insulated and is provided with air inlet and air outlet openings in the base thereof adapted to communicate with openings formed through the vehicle roof. This insulated compartment houses a casing which carriers one or more b'owers adapted to receive air entering into the compartment and discharge this air into the casing for flowing through a filter and evaporator unit mounted in the casing. The air is cooled by the evaporator unit and recirculated back through the roof of the vehicle into the passenger or storage space. The entire unit is readily attachable to the roof of the vehicle and can be replaced with a substitute unit whenever any of the parts in the unit require servicing.

It is then an object of this invention to provide an air cooling unit of improved construction for mounting on the roof of a vehicle.

A further object of this invention is to provide a roof mounted air conditioner containing an insulated compartment for housing a casing containing an air cooling means.

A further object of this invention is to provide in a roof mounted air conditioner an improved mounting for air cooling apparatus.

A further object of this invention is to provide in a roof mounted air conditioning a casing supporting and housing elements of an air conditioning system.

A specific object of this invention is to provide in a roof mounted air conditioner, an improved mounting for the condenser unit.

A further specific object of this invention is to provide, in a roof mounted air conditioner, an improved blower mounting and air distributing means.

Other and further objects of this invention will become apparent to those skilled in the art from the following detailed description of the annexed sheets of drawings which disclose a preferred embodiment of the invention.

On the drawings:

Figure 2 is a vertical cross-sectional view, with parts broken away, taken substantially along the line II—II of Figure 1.

Figure 3 is a diagrammatic fragmentary side elevational view of an automotive vehicle having an air conditioning unit according to this invention mounted thereon and illustrated diagrammatically in vertical cross-section.

As shown on the drawings:

Figure 1:
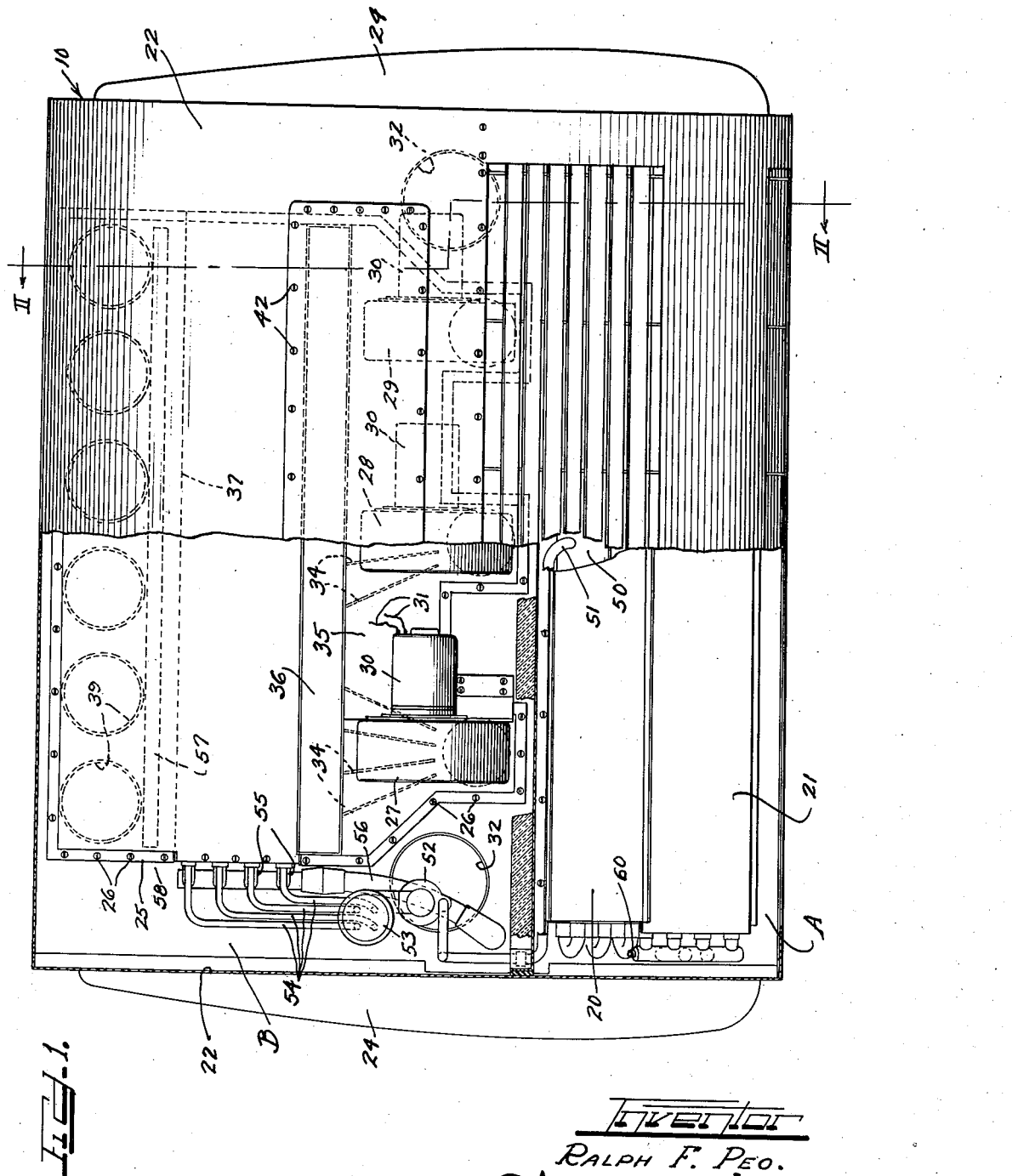
Figure 1 is a top plan view, with a part broken away and shown in horizontal cross-section, of an air conditioning unit according to this invention.

In Figures 1 and 2 the reference numeral 10 designates generally the air conditioner unit of this invention. The unit 10 is built up from a baseboard 11 which may be composed of wood as shown, metal, plastic material or the like. A metal angle strip 12 preferably is attached to the bottom of the baseboard 11 around the periphery thereof as shown in Figure 2. The baseboard 11 may be covered with a metal top 13.

At the front end of the baseboard, on each side thereof, are mounted upright brackets 14 supporting louvers 15 extending therebetween in spaced parallel relation as shown in Figure 2.

A metal plate 16 is secured to the baseboard 11 and extends upwardly therefrom as shown in Figure 2. Brackets 17 are mounted to each side of the plate 16 and support louvers 18 extending therebetween in spaced parallel relation as shown.

Brackets 19 are mounted on the baseboard 11 in front of the plate 16 and support a rigid condenser unit 20 in tilting relation relative to the baseboard. The condenser unit 20 carries a plate 21 on the top thereof secured to the brackets 14 and 17 at the ends thereof.

A thin metal sheet 22 is mounted on the baseboard 11 and extends over the plate 16 and around the condenser unit 20 to define compartments A and B as shown in Figure 2.

The compartment B is insulated with any suitable type of insulation such as a molded insulation 23 lining the sheet metal walls 16 and 22 of the compartment.

Metal or plastic casings 24 (Figure 1) can be secured to the side walls of the unit to reinforce the same. These casings are preferably of streamlined contour and give a pleasing effect to the side elevation of the unit. The entire unit, as shown in Figures 1 and 2, is streamlined in contour.

The compartment B houses a casing 25 secured to the baseboard 11 by a plurality of screws such as 26 (Figure 1). This casing 25 can be a single metal casting or can be fabricated from sheet metal. The member is a rigid unit and has mounted on the top thereof at the front end a plurality of blower casings 27, 28 and 29. Each blower casing carries an electric motor 30 for driving the fan in the casing. Energy can be supplied to the electric motor from the battery of the vehicle through wires 31.

As shown in Figure 1, the casing 25 is in spaced relation from the side walls of the unit 10. Openings 32 are cut through the baseboard 11 and metal covering 13 therefor between the side walls of the unit and the side of the member 25 near the front end of said member. The openings 32 communicate with the passenger or storage space of the vehicle to be cooled. The blowers draw the air entering the openings 32 through openings formed in the sides of the blower casings 27, 28 and 29 and this air is discharged from the blower casings through the discharge ports 33 thereof as shown in Figure 2. These discharge ports 33 are inside of the member 25 so that the air leaving the discharge ports is propelled along baffle plates 34 in an air distributing passageway 35 of the member 25. The baffle plates 34 spread the air out to flow through a filter 36 interposed in the member 25 and extending the full width of the member.

An evaporator unit 37 is mounted adjacent the filter 36 in the member 25 and air passing through the filter circulates around the cooling coils of the evaporator to be cooled by contact therewith. The rear end of the casing 25 provides a chamber 38 communicating with a plurality of openings 39 formed through the baseboard 11 and metal cover 13 therefor. The openings 39 are in communication with the passenger or storage space of the vehicle to be cooled through the roof of the vehicle and the air is thus propelled through these openings into the vehicle. It is preferable to provide a plurality of discharge ports 39 as shown in Figure 1 to prevent the ejection of air at high velocities onto the heads of passengers in the vehicle thereby causing drafts.

An opening 40 may be provided in the top of the unit 10 as shown in Figure 2. This opening is closed by an insulated cover 41 which is secured to the unit 10 by a plurality of screws or bolts 42 as shown in Figure 1 to prevent leakage of air from the compartment B. The cover 41 can be removed permitting access to the compartment B for adjustment of the elements therein and for replacement of the filter 36. This filter 36 slides into position in the member 25 and is readily removed as is evident from Figure 2.

In the compartment A, beneath the condenser 20 therein, there is mounted a receiver 50 for liquid refrigerant from the condenser. This receiver 50 extends substantially the full length between the brackets 19 supporting the condenser 20.

A tube 51 is disposed into the receiver 50 preferably in the center thereof as shown in Figure 1 and conveys liquid refrigerant from the receiver to an expansion valve 52 mounted in compartment B. The refrigerant is flashed from the expansion valve into a header chamber 53 as shown in Figures 1 and 2. As best shown in Figure 1 a plurality of tubes 54 conveys the refrigerant from the header 53 to each bank of the cooling coils 55 in the evaporator 37. The spent refrigerant is removed from the evaporator 37 by a suction line 56 leading to the vacuum side of the pump (not shown).

A flange or angle member 57 is preferably mounted adjacent the bottom of the evaporator unit 37 to collect moisture condensed on the evaporator coils as it flows therefrom and prevent this moisture from dripping through the exhaust ports 39. A drain tube 58 may be provided to drain the trough defined by the member 57.

Refrigerant can be supplied to replace loss by leakage or to charge the system through a feed pipe 60 extending above the compartment A and communicating with the condenser 20.

As shown in Figure 3, the unit 10 can be readily mounted on the roof 61 of an automobile body 60 and can be fitted to the contour of the roof 61 by means of a shroud skirt 62 surrounding the baseboard 11 of the unit. In this manner, standard units can be provided and fitted to all shapes of the roofs by merely utilizing different shaped shroud skirts 62 for each roof-line contour. The skirts 62 can be attached to the baseboard or to the metal housing cover 22.

The suction line 56 from the evaporator 37 can be disposed between the upholstered inside roof of the vehicle 60 and the outside roof 61 and enter the motor compartment (not shown) by being disposed in a windshield post of the vehicle. The compressor pump of the system is driven by the motor of the vehicle and the compressed refrigerant can be supplied to the condenser 20 through a feed tube 63 likewise disposed in a windshield post of the vehicle 60 and between the upholstered roof and outside roof 61 of the vehicle.

The inlet and discharge ports 32 and 39 of the unit 10 can be readily communicated with openings formed through the roof 61 of the vehicle by means of coupling hoses such as 64 and 65 but it is obvious that any coupling means can be used. The hoses 64 and 65 are adapted to slip into the openings 32 and 39 in tight frictional engagement therewith.

From the above description it should be understood that the air conditioner unit of this invention comprises a streamlined housing adapted to be mounted on the roof of an automotive vehicle. The unit has front and rear isolated compartments with the front compartment being in free air receiving relation with the surrounding atmosphere and the rear compartment being airtight and insulated. The front compartment houses the condenser of a compressor-condenser-evaporator type refrigerating system while the rear compartment houses a casing in which is contained the evaporator of the system. Air from the interior of the vehicle is circulated into the rear compartment adjacent the sides of the casing therein. The blower units mounted on the casing draw the air from the compartment and blow the same into the casing for passage through a filter contained therein and around the evaporator coils. The air cooled by contact with the evaporator coils is propelled back through the roof of the vehicle into the space to be cooled. The unit is compact, readily installed and efficient in operation.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A standardized air conditioning unit adapted to be mounted on the roof of an automotive vehicle for cooling the passenger or storage space therein comprising a flat base, walls supported by said base defining front and rear isolated compartments thereover, said front compartment having openings in the front and top thereof whereby air can be freely circulated therethrough, a condenser unit in said front compartment in the path of said air, a rigid casing in the rear compartment, a blower carried by said casing for propelling air therethrough, a discharge port through said base communicating with said casing and an evaporator unit in said casing in the path of the air propelled therethrough adapted to receive condensed refrigerant from the condenser.

2. An air conditioning unit for closed type automobiles comprising a housing adapted to be mounted on top of the roof of said automobiles, said housing having an insulated compartment therein, a rigid casing in said compartment, a blower mounted on said casing for discharging air therein, baffle plates in said casing for spreading the air discharged from the blower, a removable filter unit in said casing in the path of said air and a cooling unit in said casing ahead of said filter unit.

3. An air conditioning unit for automotive vehicles adapted to be mounted on the roof of said vehicles comprising a streamlined housing having inlet and outlet ports in the base thereof adapted to communicate with openings through the roof of the vehicle for drawing air from the vehicle and discharging cooled air into the vehicle, a rigid casing in said housing, a blower carried by said casing adapted to receive air entering into the housing through the inlet port thereof and discharge said air into said casing, said casing having a discharge opening communicating directly with the discharge ports of the housing and an evaporator unit in said casing in the path of the air propelled therethrough.

4. An air conditioning unit adapted to be mounted on the roof of an automotive vehicle comprising a housing having front and rear isolated compartments, said front compartment having louvered openings in the front and top thereof, a condenser unit angularly disposed in said front compartment between the openings thereof whereby air entering through the front of the compartment circulates around the condenser and is discharged at the top of the compartment, a rigid casing in said rear compartment adapted to receive air from the interior of the vehicle, a blower carried by said casing for impelling the air therethrough, said casing having a discharge opening in communication with the interior of the vehicle and an evaporator unit in said casing in the path of air impelled therethrough.

5. A self-contained air conditioning unit adapted to be mounted on top of the roof of an automotive vehicle comprising a streamlined housing having front and rear isolated compartments, said front compartment adapted to receive outside air therethrough, a condenser angularly disposed in said front compartment in the path of said air, said rear compartment being insulated and air-tight and having a rigid casing therein, inlet and outlet ports in the base of said rear compartment communicating through the roof of the vehicle with the passenger or storage space thereof, a blower in said rear compartment adapted to receive air from the inlet port and discharge the air directly into the casing, a removable filter unit in said casing and an evaporator unit adjacent said filter unit in said casing in the path of air impelled therethrough.

6. An air conditioning unit adapted to be mounted on the roof of an automotive vehicle comprising a streamlined housing having isolated front and rear compartments, said front compartment having louvered openings in the front and top thereof for the free circulation of air therethrough, a condenser unit in said front compartment in the path of air flowing therethrough, a receiver in said front compartment adapted to receive condensed refrigerant from the condenser, a rigid casing in said rear compartment, a blower carried by said casing having an intake port for receiving air from the compartment and a discharge port in said casing, an expansion valve in said rear compartment adapted to receive refrigerant from the receiver in the front compartment, an evaporator unit in said casing adapted to receive refrigerant from the expansion valve, and a filter unit adapted to be set into said casing ahead of the evaporator unit therein.

7. An air conditioning unit comprising a housing adapted to be mounted on top of the roof of a vehicle, front and rear compartments in said housing, said housing having an opening therethrough giving entrance to said rear compartment, a closure for said opening, said front and rear compartments each having separate air inlet and air outlet ports, a casing in said rear compartment having an outlet port directly communicating with the outlet port of the compartment, a blower having a discharge port communicating with the interior of said casing and an intake port adapted to receive air from the air inlet port of said rear compartment, a heat exchanger in said casing in heat exchange relation with air passing therethrough, and a condenser in said front compartment between the inlet and outlet ports thereof whereby air received into the rear compartment through the inlet opening thereof is discharged by the blower through the casing into direct communication with the air outlet port of the compartment and conditioned air cannot leak out of said compartment.

RALPH F. PEO.